(12) United States Patent
Joseph et al.

(10) Patent No.: US 9,488,259 B2
(45) Date of Patent: Nov. 8, 2016

(54) ACTUATOR AND METHOD OF ACTUATING

(75) Inventors: Paul Joseph, Missouri City, TX (US); Steve Bogard, Houston, TX (US); Luis E. Mendez, Houston, TX (US)

(73) Assignee: BAKER HUGHES INCORPORATED, Houston, TX (US)

(\*) Notice: Subject to any disclaimer, the term of this patent is extended or adjusted under 35 U.S.C. 154(b) by 1980 days.

(21) Appl. No.: 12/642,130

(22) Filed: Dec. 18, 2009
(Under 37 CFR 1.47)

(65) Prior Publication Data

US 2011/0146265 A1  Jun. 23, 2011

(51) Int. Cl.
*F02G 1/04* (2006.01)
*F16H 31/00* (2006.01)
*E21B 41/00* (2006.01)

(52) U.S. Cl.
CPC ............ *F16H 31/007* (2013.01); *E21B 41/00* (2013.01); *Y10T 74/18056* (2015.01)

(58) Field of Classification Search
USPC .................................................. 60/527–529
See application file for complete search history.

(56) References Cited

U.S. PATENT DOCUMENTS

| | | | |
|---|---|---|---|
| 6,321,845 B1* | 11/2001 | Deaton | 166/363 |
| 6,433,991 B1* | 8/2002 | Deaton et al. | 361/191 |
| 6,574,958 B1 | 6/2003 | MacGregor | |
| 6,684,724 B2* | 2/2004 | Narasimhiah et al. | 74/118 |
| 2002/0023759 A1* | 2/2002 | Deaton | 166/381 |
| 2006/0235424 A1* | 10/2006 | Vitale et al. | 606/90 |
| 2008/0022674 A1* | 1/2008 | Brown et al. | 60/527 |
| 2008/0051820 A1* | 2/2008 | Gong et al. | 606/191 |
| 2009/0143730 A1* | 6/2009 | De Polo et al. | 604/131 |
| 2009/0241537 A1* | 10/2009 | Browne et al. | 60/527 |
| 2010/0078173 A1* | 4/2010 | Buytaert et al. | 166/302 |
| 2010/0132957 A1* | 6/2010 | Joseph et al. | 166/381 |

OTHER PUBLICATIONS

Ning Ma et al., "Design and Performance Evaluation of an Ultradeepwater Subsea Blowout Preventer Control System Using Shape Memory Alloy Actuators"; Society of Petroleum Engineers, SPE Paper No. SPE101080; Sep. 24, 2006.

Dennis McDaniel et al., "Extended-Stroke Downhole Power Unite Successfully Pulls Subsea Wellhead Plugs in the Gulf of Mexico"; Society of Petroleum Engineers, SPE Paper No. 116221; Sep. 21, 2008.

G. Song et al., "An Innovative Ultradeepwater Subsea Blowout Preventer (SSBOP) Control System Using Shape Memory Alloy Actuators"; Society of Petroleum Engineers, IADC/SPE Paper No. 99041; Feb. 21, 2006.

\* cited by examiner

*Primary Examiner* — Jason Shanske
(74) *Attorney, Agent, or Firm* — Cantor Colburn LLP

(57) ABSTRACT

An actuator includes, a housing, an expandable member housed within the housing configured to expand and contract, an elongated member in operable communication with the expandable member, and a ratchet in operable communication with at least one of the expandable member and the elongated member. The ratchet is configured to allow movement of the elongated member in a first direction relative to the housing in response to expansion of the expandable member and to prevent movement of the elongated member in a second direction in response to contraction of the expandable member until the elongated member has moved a selected dimension, after which the ratchet automatically permits movement of the elongated member in the second direction.

21 Claims, 4 Drawing Sheets

ACTUATOR AND METHOD OF ACTUATING

BACKGROUND

Actuators, such as those commonly deployed downhole use a variety of mechanisms to generate relative motion to cause actuation. One such mechanism is a Shape Memory Alloy (SMA). A shape memory alloy changes shape in response to changes in temperature. Actuators employing shape memory alloys allow operators to actuate downhole tools in response to changing a temperature of a shape memory alloy employed therein. Typical shape memory alloy actuators are limited to a single actuation stroke length. Methods and systems to permit multiple actuation stroke lengths with a single shape memory actuator would be well received in the industry.

BRIEF DESCRIPTION

Disclosed herein is an actuator. The actuator includes, a housing, an expandable member housed within the housing configured to expand and contract, an elongated member in operable communication with the expandable member, and a ratchet in operable communication with at least one of the expandable member and the elongated member. The ratchet is configured to allow movement of the elongated member in a first direction relative to the housing in response to expansion of the expandable member and to prevent movement of the elongated member in a second direction in response to contraction of the expandable member until the elongated member has moved a selected dimension, after which the ratchet automatically permits movement of the elongated member in the second direction.

Further disclosed herein is a method of actuating an actuator. The method includes, repeatedly expanding and contracting an expandable member disposed at a housing, moving an elongated member relative to the housing in a first direction with the expanding, advancing a ratchet in operable communication with the expandable member, maintaining a position of the elongated member with the ratchet during the contracting, and allowing movement of the elongated member in a second direction with the ratchet after the elongated member has moved a selected dimension.

Further disclosed herein is an actuator. The actuator includes, a housing, an expandable member mounted at the housing, an elongated member in operable communication with the expandable member such that expansion of the elongated member causes movement of the elongated member, and a ratchet in operable communication with at least one of the expandable member and the elongated member configured to define dimensions of longitudinal movement of the elongated member relative to the housing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
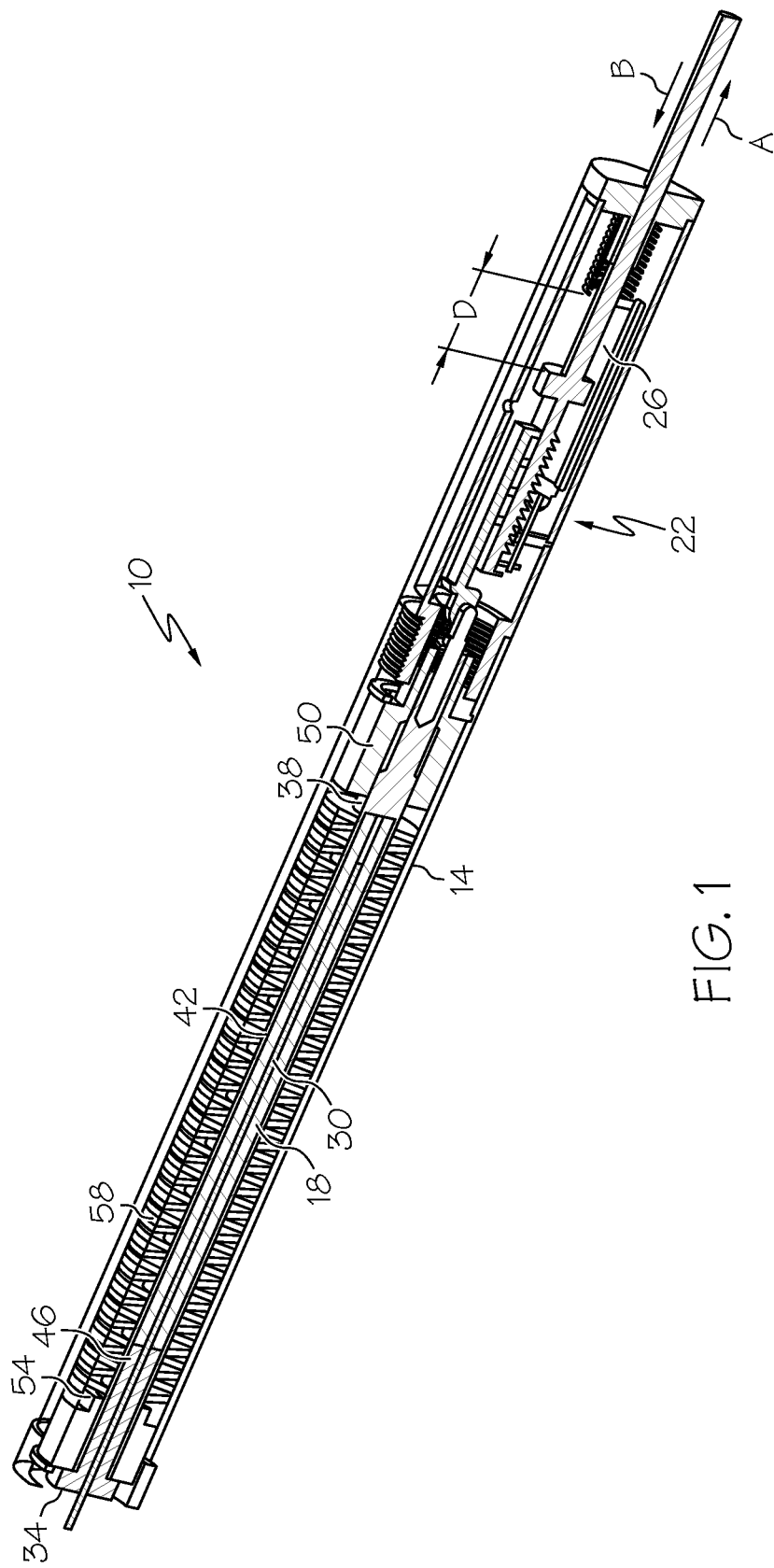
FIG. 1 depicts a cross sectional perspective view of an actuator disclosed herein.

Referring to FIG. 1, an embodiment of an actuator disclosed herein is illustrated generally at 10. The actuator 10 among other things includes, a housing 14 an expandable member 18, a ratchet 22, and an elongated member 26, illustrated herein as an axle that is longitudinally movable relative to the housing 14. The expandable member 18 is able to expand as well as contract in response to stimulus applied thereto as will be described in greater detail below. The axle 26 is in operable communication with the expandable member 18 such that the axle 26 is moved in response to either expansion or contraction of the expandable member 18 with the embodiments illustrated configured to move the axle 26, in a first longitudinal direction, per arrow A relative to the housing 14, in response to expansion of the expandable member 18. In this embodiment the ratchet 22 is in operable communication with both the expandable member 18 and the axle 26. The ratchet 22 allows or causes the axle 26 to move when the expandable member 18 expands while sometimes preventing the axle 26 from moving when the expandable member 18 contracts. The ratchet 18 thereby defines the movement of the axle 26 and in this embodiment causes the axle 26 to move a selected dimension D in the direction of arrow A.

After the axle 26 has moved the selected dimension D the ratchet 22 automatically disengages so that the axle 26 is allowed to move in a direction of arrow B, that is opposite to the direction of arrow A. By allowing this reversed direction of motion of the axle 26 the ratchet 22 allows the actuator 10 to automatically reset to its original position. The actuator 10 is thereby able to actuate a tool (not shown) attached to the housing 14 that requires an actuation stroke length of the axle 26 that is greater than an amount achievable with a single expansion cycle of the expandable member 18.

In this embodiment the expandable member 18 is made of a shape memory alloy (SMA) that expands when heated and contracts when cooled, although other expandable materials are contemplated, such as, piezoelectric materials and magnetostrictive materials, for example. The expandable member 18 has a tubular shape that surrounds a heater 30 disclosed herein as a cylindrical electric heating cartridge. The expandable member 18 is longitudinally sandwiched between a rear cup 34 that is fixedly attached to the housing 14 and a pin 38 that includes a skirt 42 that perimetrically surrounds the expandable member 18 and slidably extends over a boss 46 of the rear cup 34. This structure allows the pin 38 to move in the direction of arrow A due to longitudinal expansion of the expandable member 18, while sliding external to the boss 46 and internal to a front cap 50, which is attached to the housing 14. This movement of the pin 38 is reversed in response to contraction of the expandable member 18. As the expandable member 18 longitudinally contracts, the pin 38 is moved in the direction of arrow B under a biasing load applied to a shoulder 54 on the pin 38 by biasing member 58 illustrated herein as a plurality of spring washers compressed longitudinally between the shoulder 54 and the front cup 50.

Figure 2:
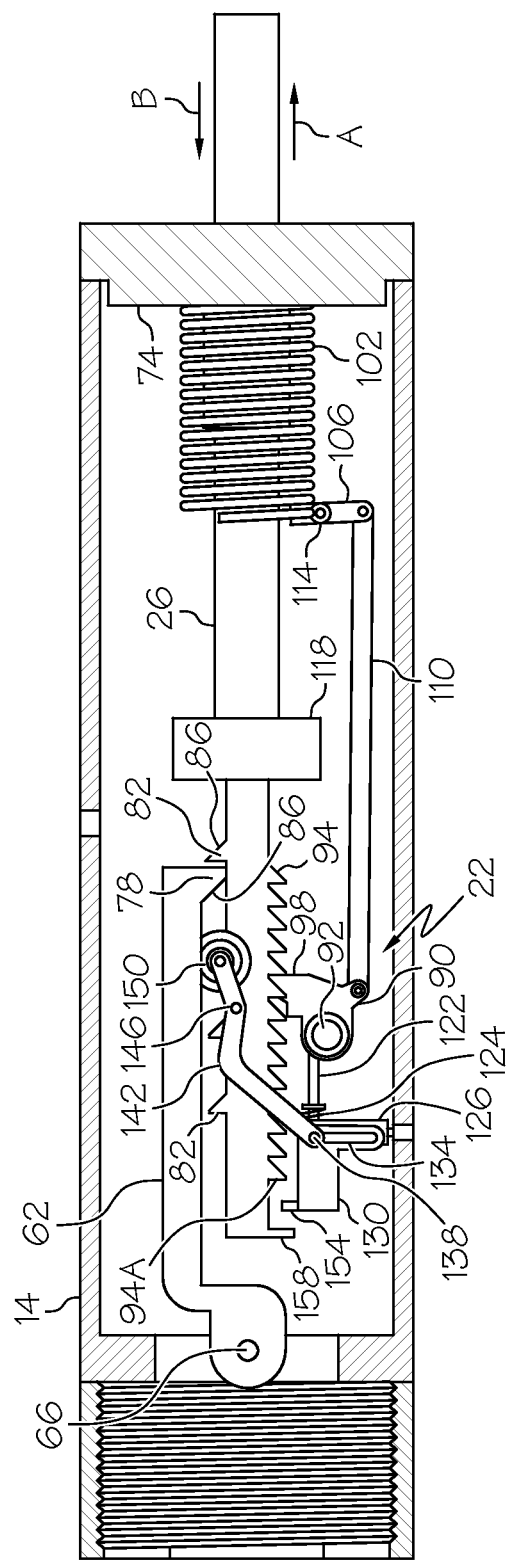
FIG. 2 depicts a magnified partial cross sectional view of the actuator of FIG. 1 with a ratchet engaged.

Referring to FIG. 2, a pivot bar 62 is rotationally pivotally connected to the pin 38 by a pivot pin 66. A biasing member (not shown), such as a torsion spring, rotationally biases the pivot bar toward the axle 26 that is slidably engaged within the tubular by a cap 74, which is attached to the housing 14. A tooth 78 on the pivot bar 62 is engagable with teeth 82 attached to the axle 26. This engagement causes the axle 26 to move in the direction of arrow A in response to being urged by the pivot bar 62 moving during expansion of the expandable member 18. Ramped surfaces 86 on one or both of teeth 78 and 82 allow momentary disengagement of the teeth 78, 82, which permits the pivot bar 62 to move back, in the direction of arrow B, without moving the axle 26 in the process.

As the axle 26 moves in the direction of arrow A a lock pawl 90 of the ratchet 22 is rotated clockwise about pivot 92 by teeth 94 of the axle 26 urging against a tooth 98 of the lock pawl 90 until one of the teeth 94 clear the tooth 98. Once cleared the tooth 98 is able to reengage with another of the teeth 94 thereby defining the ratcheting action of the ratchet 22. The lock pawl 90 is biased in the counterclockwise direction by a biasing member 102 disclosed herein as a compression spring acting on a link arm 106 and a link arm 110. The teeth 94 and 98 are shaped to prevent the axle 26 from moving in the direction of arrow B while the teeth 94, 98 are engaged.

Figure 3:
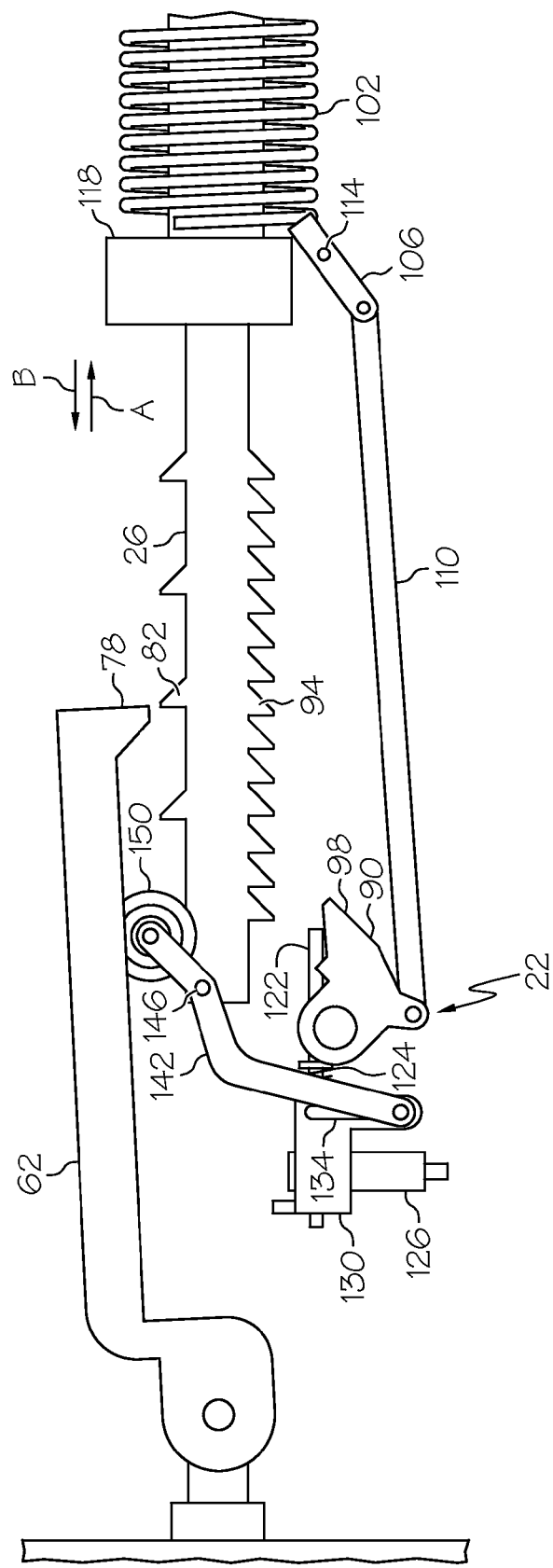
FIG. 3 depicts a magnified partial cross sectional view of the actuator of FIG. 1 with the ratchet disengaged.

Referring to FIG. 3, the foregoing ratcheting action continues as the axle 26 is moved in the direction of arrow A until the axle 26 has moved the selected dimension D (FIG. 1). The dimension D can be defined by a couple different conditions that both result in defeat of the ratchet 22 and disengagement of the tooth 78 of the pivot bar 62 from the teeth 82 of the axle 26. The first condition is due to clockwise rotation of the link arm 106 about its pivot 114 that results from urging by contact from a stop 118 on the axle 26. This rotation of the link arm 106 causes the link arm 110 to move in the direction of arrow B that causes clockwise rotation of the lock pawl 90 in the process. The rotation of the lock pawl 90 sets several additional actions in motion. A lock pin 122, biased in the direction of arrow A by a biasing member 124 relative to a pin bracket 126 that is fixedly attached to the housing 14, is allowed to move in the direction of arrow A when the lock pawl 90 has rotated a selected amount. This movement allows the lock pin 122 to lock the lock pawl 90 in a rotated position wherein the tooth 98 is disengaged from the teeth 94. The movement of the lock pin 122 also causes a slide bar 130 attached thereto to move with it. The slide bar 130 has a slot 134 within which is engaged a slide pin 138 of a disengage bar 142. As the slide bar 130 is moved the slide pin 138 slides within the slot 134, in a downward direction as viewed in the figure, causing counterclockwise rotation of the disengage bar 142 about its pivot 146. The rotation of the disengage bar 142 moves a guide bearing 150 attached thereto thereby lifting the pivot bar 62 to a point where the tooth 78 is not engaged with the teeth 82 on the axle 26. In this position the axle 26 is no longer prevented from moving in the direction of arrow B, and as such it free to move under a longitudinal biasing load in that direction from a biasing member (not shown).

The second optional condition that causes defeat of the ratchet 22 is movement of the slide bar 130 due to contact of a tab 154 on the slide bar 130 with an optional travel limiter 158 (shown in FIG. 2 only) of the axle 26. As the axle 26 moves in the direction of arrow A, due to the expansion of the expandable member 18, the slide bar 130 moves with it, causing the lock pin 122 attached thereto to move as well. The lock pin 122 rotates the lock pawl 90 thereby disengaging the tooth 98 from the teeth 94 and locking the lock pawl 90 in the rotated position as illustrated in FIG. 3. The movement of the slide bar 130 also causes the disengage bar 142 to rotate counterclockwise in the same manner that it did in response to the movement of the slide bar 130 as discussed above, again resulting in the lifting of the pivot bar 62 and disengagement of the tooth 78 from the teeth 82.

Regardless of which condition caused defeat of the ratchet 22 the ratchet 22 is reengaged by a same action, which is contact between a first tooth 94A with the tab 154 (FIG. 2) that moves the slide bar 130 in the direction of arrow B. This movement reverses the rotation of the disengage bar 142 allowing the teeth 78, 82 to reengage, and the release of the lock pin 122 from holding the lock pawl 90 from rotating counterclockwise whereby its tooth 98 reengages with the teeth 94. The spring 102 also aids in rotating the lock pawl 90 counterclockwise through the link arms 106 and 110 as discussed above. The foregoing structure thereby allows the position of the first tooth 94A along the axle 26 to define a position of the axle 26 relative to the housing 14 at which point the actuator 10 is reset. Additionally one of the directions of travel that define the dimension D is also established thereby.

Figure 4:
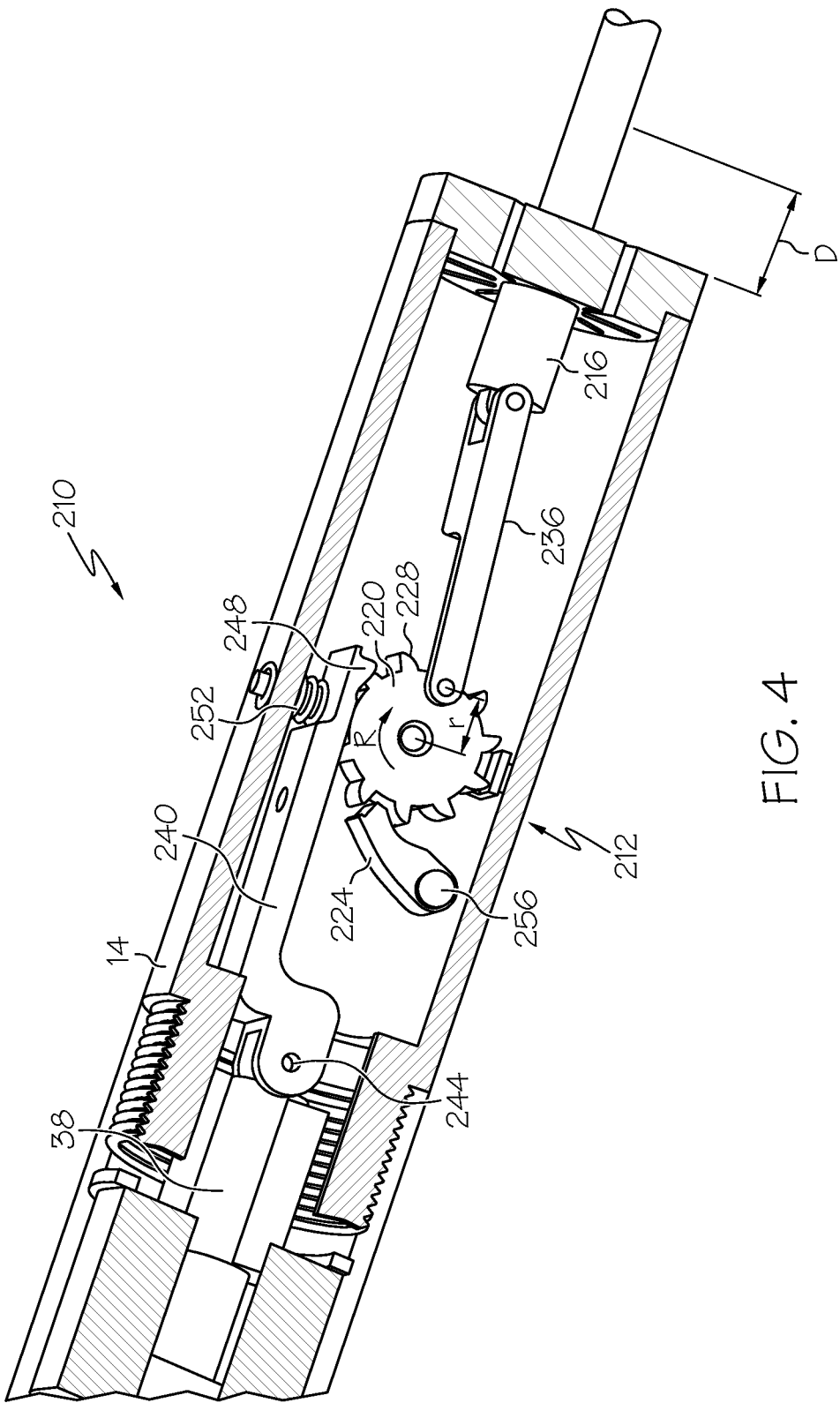
FIG. 4 depicts a partial cross sectional view of an alternate actuator disclosed herein.

Referring to FIG. 4, an alternate embodiment of an actuator disclosed herein is illustrated generally at 210. A portion of the actuator 210 that causes the reciprocating motion of the pin 38 relative to the housing 14 is substantially the same as in the previously presented embodiments and is therefore not discussed again here. A ratchet 212 that defines the dimension D of travel of an elongated member 216, illustrated here as an axle, of this embodiment includes, a wheel 220 in operable communication with both the pin 38 and the axle 216, and a lock pawl 224 engagable with teeth 228 of the wheel 220. A link arm 236 pivotally connected to both the wheel 220 and the axle 216 causes the axle 216 to move longitudinally in a reciprocating motion in response to rotation of the wheel 220 in a single directional rotation identified by arrow "R."

A pivot bar 240, similar to pivot bar 62, is pivotally attached to the pin 38 at pivot pin 244. A tooth 248 on the pivot bar 240 engages with the teeth 228. The teeth 248 and 228 are shaped to allow the wheel 220 to rotate in the direction of arrow R while preventing the wheel 220 from rotating in the opposing direction. A biasing member 252, shown as a compression spring, biases the pivot bar 240 toward the wheel 220 at all times. The lock pawl 224 pivots relative to the housing 14 about pin 256 and is shaped to allow the wheel 220 to rotate in the direction of arrow R while preventing it from rotating in an opposing direction. The lock pawl 224 is also biased against the wheel 220 to assure the lock pawl 224 remains engaged with the teeth 228 of the wheel 220.

The foregoing structure results in the expansion and contraction of the expandable member 18 (FIG. 1) causing indexed rotation of the wheel 220 in the direction of arrow R and indexed longitudinal reciprocating motion of the axle 216. The dimension D of motion of the axle 216 is equal to two times a radial dimension r, defined as the radial dimension at which the link arm 236 is attached to the wheel 220. The motion of the axle 216 is an interrupted sinusoidal motion and as such has a nonlinear relationship to the motion of the pin 38.

The foregoing embodiments of actuators 10, 210 can be employed to actuate tools in a downhole environment such as for hydrocarbon recovery or carbon dioxide sequestration, for example. Such applications could include actuation of valves, slips and seals, for example.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. An actuator comprising:
a housing;
an expandable member housed within the housing configured to expand and contract;
an elongated member in operable communication with the expandable member; and
a ratchet in operable communication with at least one of the expandable member and the elongated member being configured to allow movement of the elongated member in a first direction relative to the housing in response to expansion of the expandable member and to prevent movement of the elongated member in a second direction in response to contraction of the expandable member until the elongated member has moved a selected dimension, the ratchet automatically permits movement of the elongated member in the second direction in response to the elongated member having moved the selected dimension.

2. The actuator of claim 1, wherein the second direction is opposite to the first direction.

3. The actuator of claim 1, wherein the actuator is a downhole actuator.

4. The actuator of claim 1, wherein the expandable member is expandable and contractible in response to an external input.

5. The actuator of claim 4, wherein the external input is a change of temperature.

6. The actuator of claim 1, further comprising a heating element in operable communication with the expandable member.

7. The actuator of claim 1, wherein the expandable member is a shape memory alloy.

8. The actuator of claim 7, wherein the shape memory alloy expands in response to increases in temperature.

9. The actuator of claim 1, wherein the ratchet includes a lock pawl engagable with teeth on the elongated member.

10. The actuator of claim 9, wherein engagement of the lock pawl is defeatable upon movement of the elongated member the selected dimension.

11. The actuator of claim 1, wherein the ratchet includes a lock pawl that is engagable with teeth of a wheel.

12. The actuator of claim 11, wherein a radial dimension of attachment of a link to the wheel controls a stroke length of the elongated member.

13. A method of actuating an actuator, comprising:
repeatedly expanding and contracting an expandable member disposed at a housing;
moving an elongated member relative to the housing in a first direction with the expanding;
advancing a ratchet in operable communication with the expandable member;
maintaining a position of the elongated member with the ratchet during the contracting; and
allowing movement of the elongated member in a second direction with the ratchet in response to the elongated member having moved a selected dimension.

14. The method of actuating the actuator of claim 13, further comprising changing a temperature of the expandable member to cause the expanding.

15. The method of actuating the actuator of claim 13, further comprising defeating the ratchet upon movement of the elongated member the selected dimension.

16. The method of actuating the actuator of claim 15, further comprising reengaging the ratchet after the elongated member has moved a selected dimension in the second direction.

17. The method of actuating the actuator of claim 16, wherein the reengaging is automatic.

18. The method of actuating the actuator of claim 15, wherein the defeating is automatic.

19. The method of actuating the actuator of claim 13, further comprising decoupling the expandable member from the elongated member after having moved the elongated member the selected dimension.

20. An actuator comprising:
a housing;
an expandable member mounted at the housing;
an elongated member in operable communication with the expandable member such that expansion of the expandable member causes movement of the elongated member in a first direction; and
a ratchet in operable communication with at least one of the expandable member and the elongated member configured to define dimensions of longitudinal movement of the elongated member relative to the housing, the ratchet being configured to automatically permit movement of the elongated member in a second direction in response to the elongated member having moved a selected dimension.

21. The actuator of claim 20, wherein the relationship between longitudinal movement of the elongated member and each longitudinal expansion of the expandable member is nonlinear.

* * * * *